(12) United States Patent
Maeda

(10) Patent No.: US 8,045,207 B2
(45) Date of Patent: Oct. 25, 2011

(54) IMAGE PROCESSING APPARATUS, METHOD, AND COMPUTER PROGRAM PRODUCT EXTRACTING INFORMATION FROM OPERATION HISTORY AND REGISTERING WORKFLOW

(75) Inventor: Ryo Maeda, Fujisawa (JP)

(73) Assignee: Canon Kabushiki Kaisha (JP)

( * ) Notice: Subject to any disclaimer, the term of this patent is extended or adjusted under 35 U.S.C. 154(b) by 562 days.

(21) Appl. No.: 12/259,778

(22) Filed: Oct. 28, 2008

(65) Prior Publication Data

US 2009/0109478 A1    Apr. 30, 2009

(30) Foreign Application Priority Data

Oct. 29, 2007  (JP) ................................ 2007-280592

(51) Int. Cl.
*G06T 1/00*      (2006.01)
*G06F 9/46*      (2006.01)
(52) U.S. Cl. ...................................... 358/1.15; 718/100
(58) Field of Classification Search ................. 358/1.13, 358/1.15, 501, 537, 401, 452, 468; 718/100, 718/102; 707/608; 709/223
See application file for complete search history.

(56) References Cited

U.S. PATENT DOCUMENTS

| 6,889,375 | B1 * | 5/2005 | Chan et al. | 717/123 |
| 7,743,364 | B2 * | 6/2010 | Nakata et al. | 717/123 |
| 2008/0004925 | A1 * | 1/2008 | Bangel et al. | 705/7 |
| 2009/0027718 | A1 * | 1/2009 | Suzuki et al. | 358/1.15 |
| 2010/0185477 | A1 * | 7/2010 | Soga | 705/7 |

FOREIGN PATENT DOCUMENTS

JP          2007-7922 A       1/2007

* cited by examiner

*Primary Examiner* — Scott A Rogers
(74) *Attorney, Agent, or Firm* — Rossi, Kimms & McDowell LLP

(57) ABSTRACT

An image processing apparatus, in which an operator can register a workflow with an easy operation, the usage of a routine task function can thus be facilitated, and the work efficiency of the operator can be improved. A plurality of functions for an image processing are provided with the image processing apparatus capable of executing a process including a combination of the plurality of the functions as a workflow. An operation unit receives an operation by an operator for the image processing apparatus. A storing unit stores the operation, which is received by the operation unit, by the operator as an operation history. An extracting unit extracts operation information for causing the workflow to be executed from the operation history stored in the storing unit. A registering unit registers the operation information extracted by the extracting unit.

10 Claims, 13 Drawing Sheets

FIG.8

```
<?xml version="1.0" encoding="utf-8"?>
<Taskflow id="1" caption="" comment="..." date="...">
 <Task type="Scan">
  <Setting>....</Setting>
 </Task>
 <Task type="Preview">        ~2420
 </Task>
 <Task type="Send">
  <Setting type="Addr">
    196.168.0.1              ~2420
  </Setting>
  <Setting>....</Setting>
 </Task>
 <Task type="Print">
  <Setting>....</Setting>
 </Task>
</Taskflow>
```

FIG.10

```
<?xml version="1.0" encoding="utf-8"?>
<Taskflow id="1" caption="" comment="..." date="...">
 <Task type="Scan">
  <Setting>....</Setting>
 </Task>
                   ←—1510
 <Task type="*">

</Task>
 <Task type="Send">
  <Setting type="Addr">
   196.168.0.1
  </Setting>
                    ←—1520
  <Setting>*</Setting>
                    ←—1520
  <Setting>*</Setting>

</Task>
</Taskflow>
```

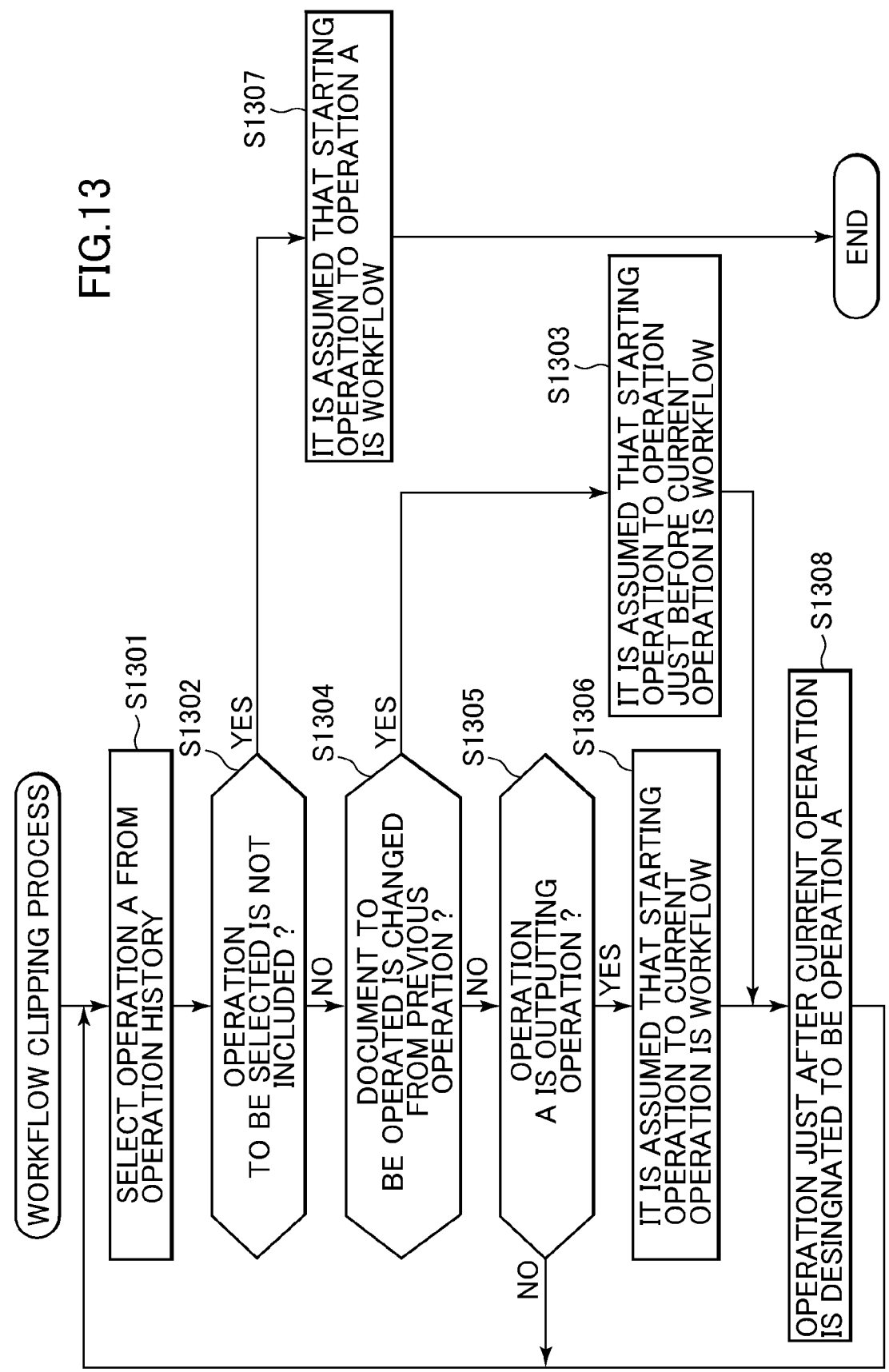

IMAGE PROCESSING APPARATUS, METHOD, AND COMPUTER PROGRAM PRODUCT EXTRACTING INFORMATION FROM OPERATION HISTORY AND REGISTERING WORKFLOW

BACKGROUND OF THE INVENTION

1. Field of the Invention

The present invention relates to an image processing apparatus, a workflow registering method, and a storage medium, and more particularly, to an image processing apparatus provided with a function for automatically registering device operation information including a series of settings and functions with a routine task function, a workflow registering method, and a storage medium.

2. Description of the Related Art

In recent years, an image processing apparatus, which is represented by a digital copying machine, and the like, has been highly and multiply functionalized. The highly-functional image processing apparatus is provided with a storing function for storing an image in a database as a file, a storing function for storing a document in a storage in the apparatus, a transmitting function for transmitting an image on a network with a network protocol such as an e-mail, a transmitting and receiving function for transmitting and receiving the document through the network and the like in addition to a function for copying a original sheet.

In the image processing apparatus, it is troublesome for an operator to repeatedly and similarly operate various setting works for functions of the image processing apparatus every time the operator executes repeatedly the same process. Thus, some of the highly-functional image processing apparatuses are provided with a routine task function to simplify the operation when the operator repeats the same process.

This routine task function is a function for storing and recreating, based on functions of the image processing apparatus, a document reading function, a printing function, and a network transmitting and receiving function as a series of operations on a console panel.

In the routine task function, for example, a series of processes, which are obtained by storing and customizing operation information set by the operator, are registered, and the stored operation information is called up to be executed by an easy action such as pushing a button. That is, this routine task function is a function for storing and unifying device operation information (so-called, a workflow) including a series of settings and functions, and the device operation information can be repeatedly and easily called up to be executed.

The routine task function includes, for example, a function for assigning a variety of operations and parameters, which are selected and set by the operator, to a predetermined button named as a workflow button. The routine task function is configured so that, since the operator pushes down the predetermined workflow button, a variety of the operations and parameters, which are set to the predetermined workflow button, can be called up with one touch. When the predetermined workflow button is pushed down the called-up workflow is executed (recreated) as if the operator operates.

Concerning the conventional image processing apparatus, there has been proposed a technique which focuses on such a process that the workflow, which has been already registered by another user, is utilized to simplifying a troublesome work for registering the workflow of the routine task function.

This routine task function is provided with a function for managing the workflow button for each user individually. This routine task function is configured so that the workflow button can be set as a common button or a user-specific button, and it is determined whether or not the workflow button can be used with an access right included by each user.

In the routine task function of the image processing apparatus as configured above, in a case where the workflow button is managed for each operator, the workflow of each operator is generated by using the workflow of other user as a reference (for example, refer to Japanese Laid-Open Patent Publication (Kokai) No. 2007-7922).

In the routine task function of the conventional image processing apparatus as described above, it is a main object to generate the predetermined useful workflow of the operator itself by using the workflow of other operator as a reference, so that, the workflow is generated based on the workflow which has been already registered for other user. However, to register the predetermined operation information of the operator itself as the workflow, it is necessary to reedit the workflow along with the predetermined operation by the operator.

Thus, in the routine task function of the image processing apparatus, since such a work is troublesome that the operator operates to edit and register the workflow, it is desired to further simplify the work for registering the workflow.

SUMMARY OF THE INVENTION

The present invention provides an image processing apparatus, in which an operator can register a workflow with an easy operation, the usage of a routine task function can thus be facilitated, and the work efficiency of the operator can be improved, a workflow registering method, and a storage medium.

Accordingly, the present invention provides an image processing apparatus provided with a plurality of functions for an image processing, and capable of executing a process including a combination of the plurality of the functions as a workflow, comprising an operation unit adapted to receive an operation by an operator for the image processing apparatus, a storing unit adapted to store the operation by the operator as an operation history, the operation being received by the operation unit, an extracting unit adapted to extract operation information for causing the workflow to be executed from the operation history stored in the storing unit, and a registering unit adapted to register the operation information extracted by the extracting unit.

According to the present invention, since the operator can simplify a troublesome setting work for registering the device operation information in the image processing apparatus, the work efficiency of the operator can be improved by promoting the device operation information to be registered and utilizing a function provided in the image processing apparatus.

The features and advantages of the invention will become more apparent from the following detailed description taken in conjunction with the accompanying drawings.

BRIEF DESCRIPTION OF THE DRAWINGS

FIG. 8 is an explanatory diagram of a sample illustrating a description method for a workflow.

FIG. 10 is an explanatory diagram exemplifying a template for automatically extracting the workflow, which is provided in the image processing apparatus illustrated in FIG. 1.

FIG. 13 is a flowchart illustrating a procedure for a workflow clipping process executed at step S1102 appearing in FIG. 11.

DESCRIPTION OF THE PREFERRED EMBODIMENTS

The present invention will now be described in detail below with reference to the accompanying drawings showing a preferred embodiment thereof.

Figure 1:
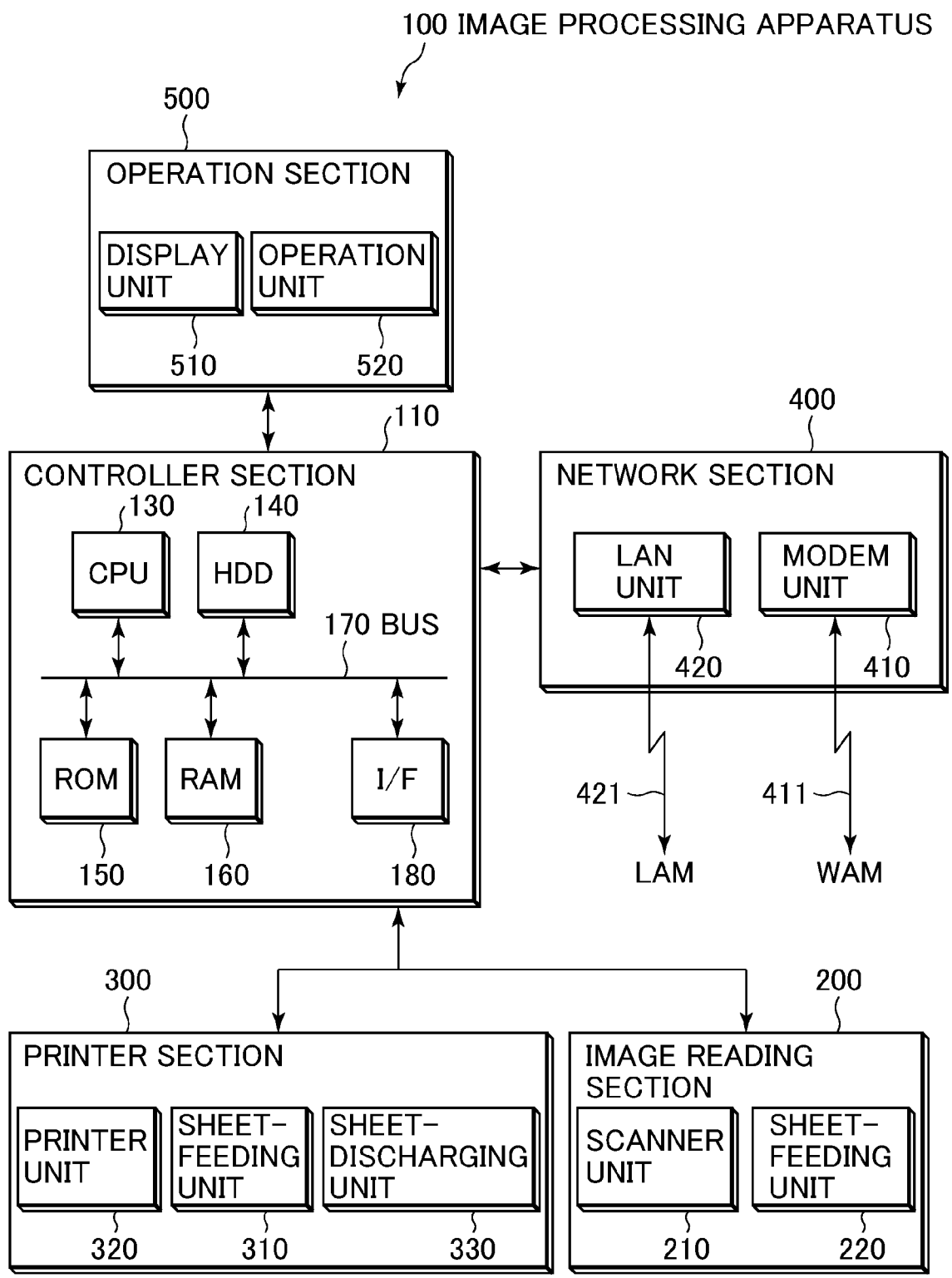
FIG. 1 is a functional block diagram illustrating a schematic configuration of an image processing apparatus according to an embodiment of the present invention.

First, an image processing apparatus according to the embodiment of the present invention will be described. FIG. 1 is a functional block diagram illustrating a schematic configuration of the image processing apparatus according to the present embodiment. As illustrated in FIG. 1, an image processing apparatus 100 is provided with a controller section (controller) 110, an image reading section 200, a printer section 300, a network section 400, and an operation section 500. This image processing apparatus 100 is configured as an image processing apparatus supporting a network in which a scanner and a printer are arranged. This image processing apparatus 100 is provided with a plurality of processing units as a variety of basic image processing functions such as print outputting, image reading, document filing, document transmitting and receiving, and image converting.

In this image processing apparatus 100, the controller section 110 controls whole operations of the image processing apparatus 100.

The controller section 110 is configured so that a CPU (Central Processing Unit) 130 is electrically connected, through a bus 170, to a HDD (Hard Disk Drive) 140, a ROM (Read Only Memory) 150, a RAM (Random Access Memory) 160, and an I/F (Interface) 180.

The CPU 130 executes a controlling operation based on a program read from the ROM 150 for storing software. Meanwhile, a program is also described in the program stored in the ROM 150, which is used to interpret the PDL (Page Description Language) code data received from a host computer, and to develop the interpreted PDL code data to raster image data.

The HDD 140 is a storage for storing image data, setting data, and an application program executed by the CPU 130, and the like.

The ROM 150 is a boot ROM, and stores a boot program of a system.

The RAM 160 is a system work memory provided for the CPU 130 to operate, and is also an image memory for temporarily storing image data.

The bus 170 is a path in which data is transmitted and received between each unit and module. The IF 180 is an interface for each unit and module.

The image reading section (image inputting device) 200, which is electrically connected to the controller section 110, is provided with a scanner unit 210 including a function for reading an original, and a sheet-feeding unit 220 including a function for transporting an original sheet. This image reading section 200 optically reads an original image to convert the read original image to image data.

The printer section 300, which is electrically connected to the controller section 110, is provided with a sheet-feeding unit 310 including a plurality of types of recording sheet cassettes, a printer unit 320 including a function for transcribing and fixing the image data to a recording sheet, and a sheet-discharging unit 330 including a function for sorting and stapling the printed recording sheet and outputting the recording sheet to outside of the apparatus.

The network section 400, which is electrically connected to the controller section 110, is connected to a WAN (public line) 411 through a modem unit 410. The network section 400 is also connected to a LAN 412 through a LAN unit 420.

The operation section 500, which is electrically connected to the controller section 110, is comprised of a display unit 510 for displaying an after-mentioned operation screen, and the like on a liquid crystal screen, and an operation unit 520 in which an inputting operation is executed using a hard key and a touch panel. This operation section 500 provides an operator I/F for operating an image input and output system.

In the image processing apparatus 100 as configured above, the controller section 110 provides a copying function for controlling the image reading section 200 to read the image data of the original, and controlling the printer section 300 to output the read image data on the recording sheet. The controller section 110 provides a scanner function for converting the image data read from the image reading section 200 to code data, and transmitting the converted code data to a not-illustrated host computer through the network section 400. The controller section 110 provides a printer function for converting the code data received from the host computer through the network section 400 to the image data, and outputting the converted image data to the printer section 300.

Next, typical functions of the image processing apparatus 100 will be described. This image processing apparatus 100 is provided with a function for executing a variety of processes such as printing and scanning, and also transmitting and receiving an image through a network. Here, the typical functions will be described by illustrating an interface operated by an operator.

Figure 2:
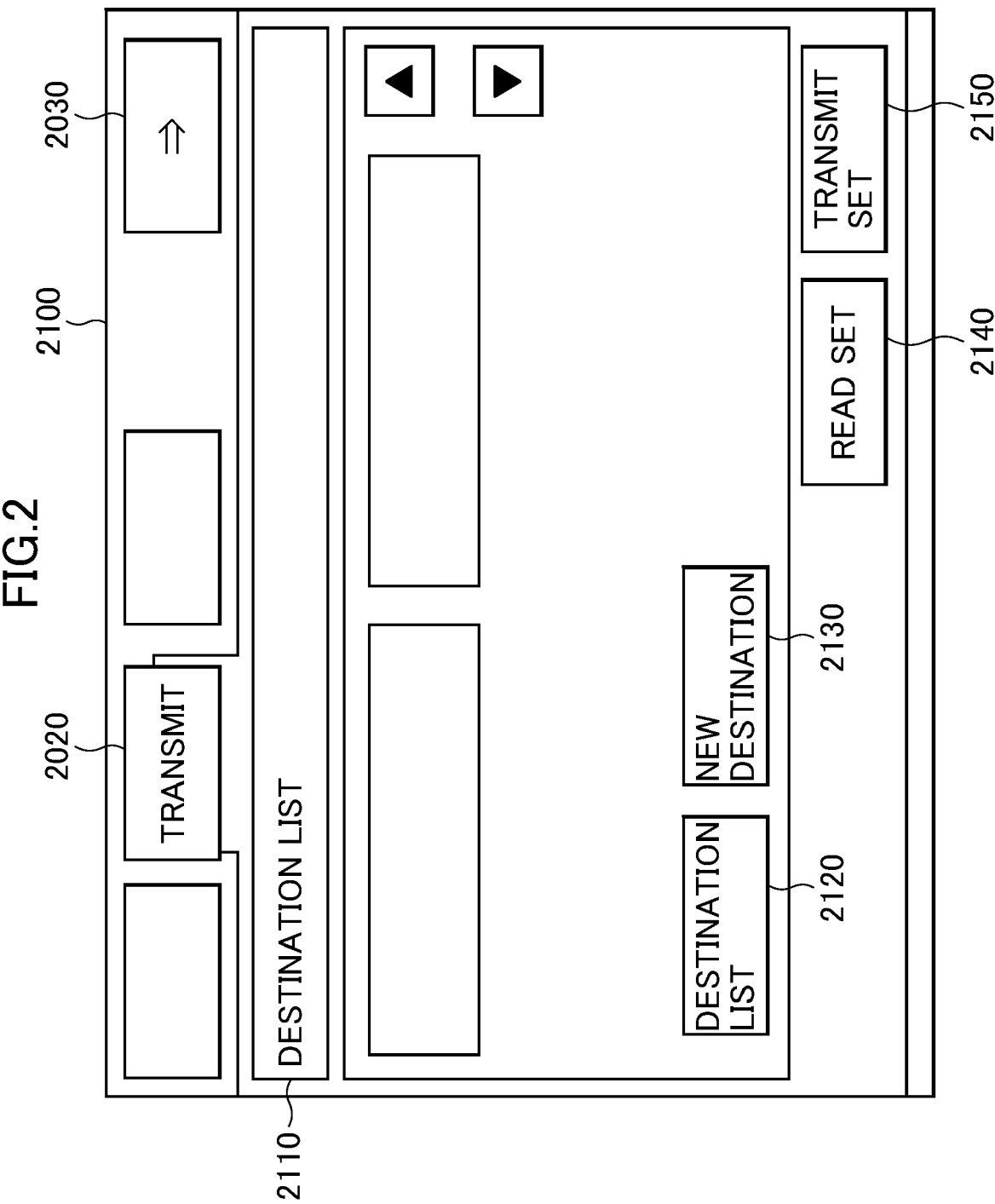
FIG. 2 is an explanatory diagram illustrating a specific operation screen displayed in a display unit illustrated in FIG. 1.

FIG. 2 is an explanatory diagram illustrating the specific operation screen displayed in the display unit 510 in FIG. 1.

The image processing apparatus 100 is provided with a variety of functions such as a printing function, a transmitting function, and a reading function. This display unit 510 is configured so that the operation screen is switched such as to correspond to the desired function by using a function switching button 2030.

The screen illustrated in FIG. 2 is the operation screen for the transmitting function, and the typical function of the image processing apparatus 100 will be described by using this operation screen as an example. The transmitting function transmits the image read by the image reading section 200 to another unit using a variety of communication protocols such as an e-mail and a facsimile. When a transmitting function tab 2020 is pushed down, a transmitting function screen 2100 is displayed. A list of transmission destinations designated by the operator is displayed in a destination list 2110 by pushing down a destination list button 2120 or a new destination button 2130. The image to be transmitted is read by the image reading section 200. The setting for reading the image is executed on a reading setting screen 2200 (illustrated in after-mentioned FIG. 3) which is opened by pushing down a read set button 2140.

A transmit set button 2150 is a button for opening a transmission setting screen for setting for the transmission. In the transmission setting screen, the transmission at a designated time, and a subject or a text in the e-mail, or the like can be designated.

Figure 3:
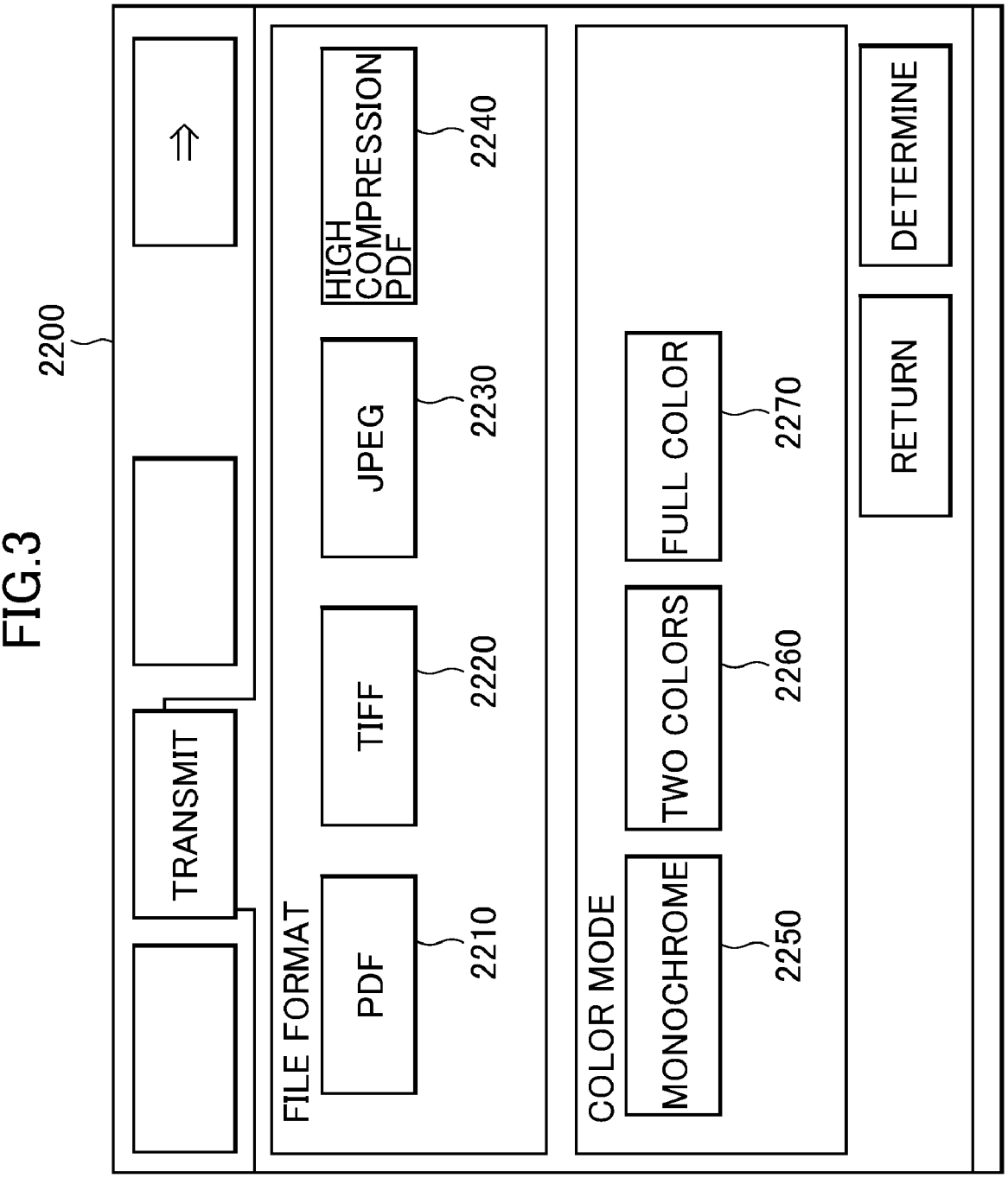
FIG. 3 is an explanatory diagram illustrating a reading setting screen displayed in the display unit illustrated in FIG. 1.

FIG. 3 is an explanatory diagram illustrating the reading setting screen 2200 displayed in the display unit 510 in FIG. 1.

The reading setting screen 2200 displays the operation screen for executing the setting for reading the original for the transmitting function, and for example, color or monochrome can be selected, and a file format can be designated. In reading setting screen 2200 illustrated in FIG. 3, the color setting can be executed by selecting from a monochrome button 2250, a two colors button 2260, and a full color button 2270. In reading setting screen 2200 illustrated in FIG. 3, the file format used for transmitting the image can be also designated. The file format setting can be executed by selecting from a PDF button 2210, a TIFF button 2220, a JPEG button 2230, a high compression PDF button 2240, and the like.

Next, as another example of the operation screen displayed in the display unit 510, the operation screen of a document filing function will be described.

Figure 4:
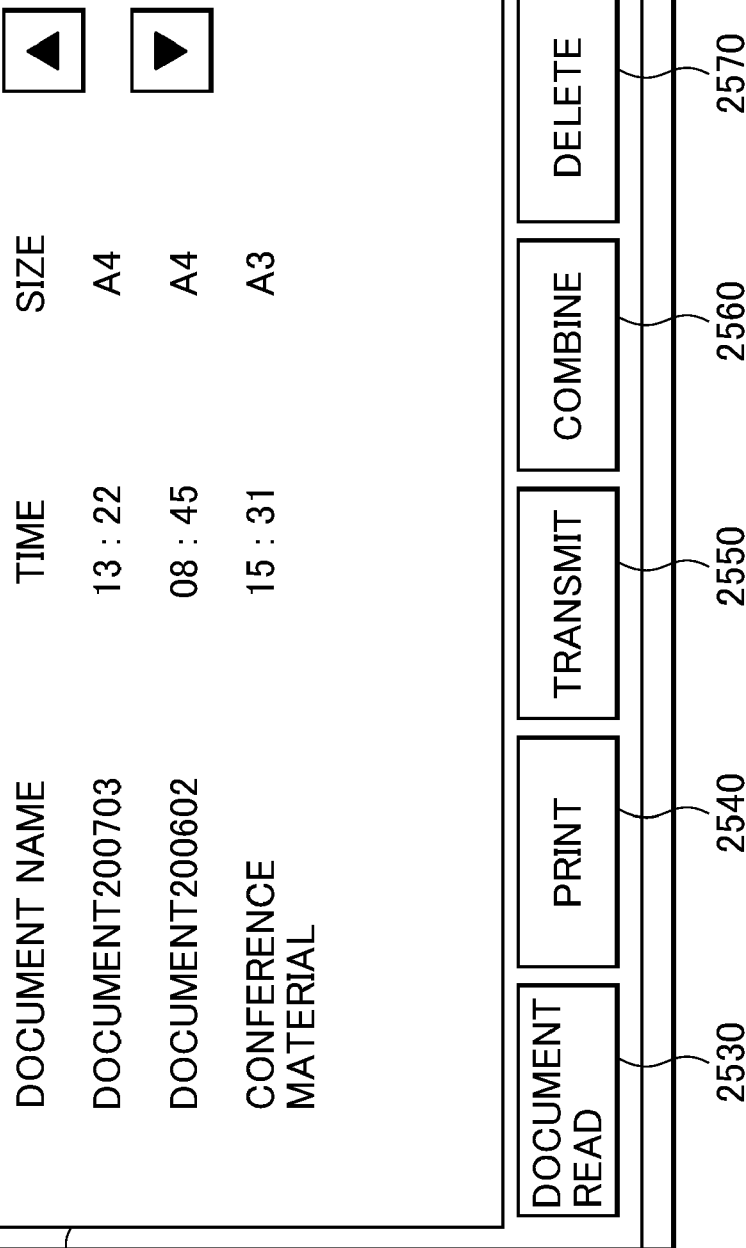
FIG. 4 is an explanatory diagram illustrating an operation screen for a document filing function, which is displayed in the display unit illustrated in FIG. 1.
Figure 5:
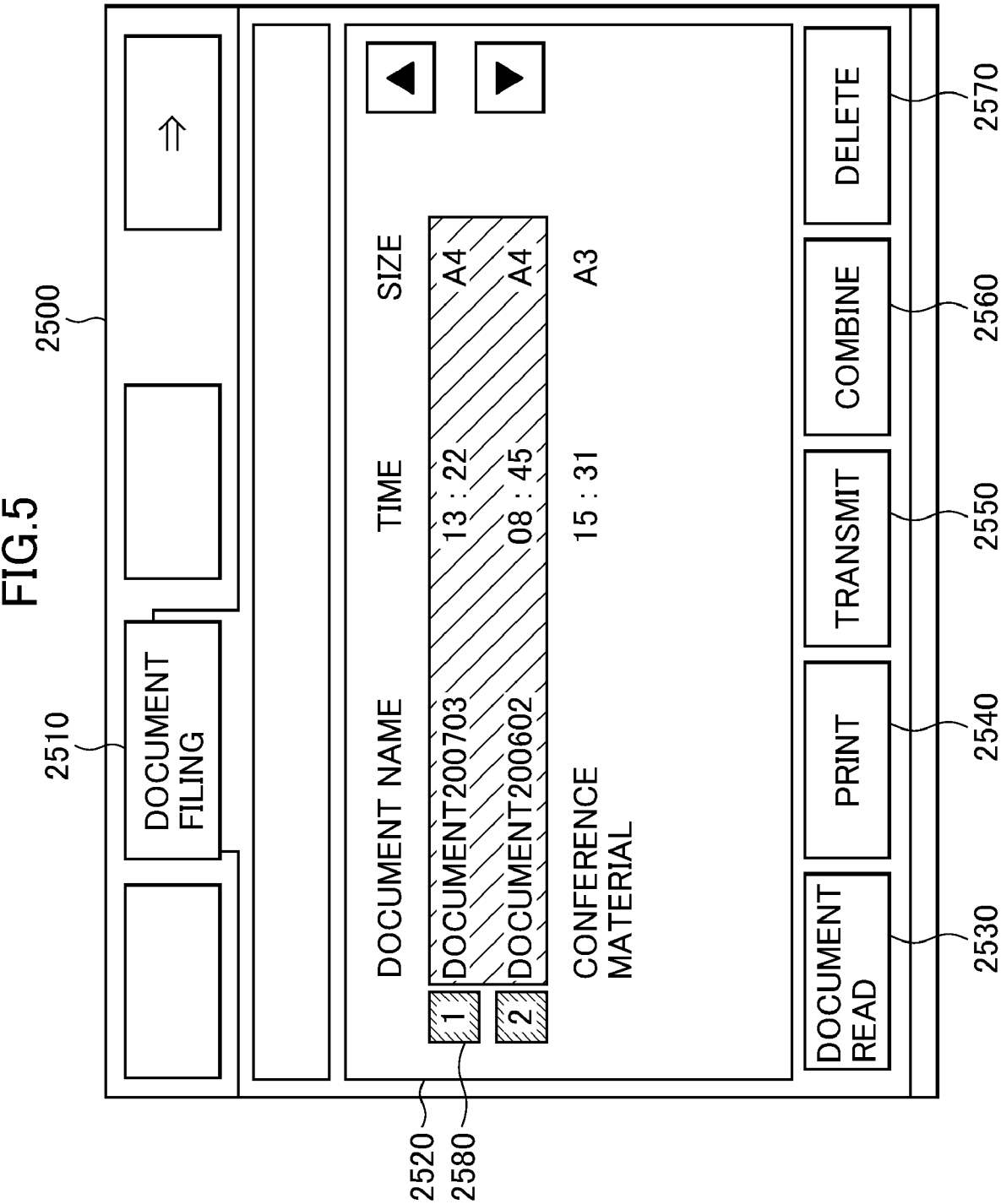
FIG. 5 is an explanatory diagram illustrating the operation screen for the document filing function, which is displayed in the display unit illustrated in FIG. 1.

FIG. 4 and FIG. 5 are explanatory diagrams illustrating the operation screen for the document filing function, which is displayed in the display unit 510 in FIG. 1.

The document filing function is a function for storing the document in the HDD 140, and printing or transmitting the stored document. When a document filing tab 2510 is pushed down, a document filing function screen 2500 illustrated in FIG. 4 is opened. The document filing function screen 2500 includes a document list 2520 displaying the stored document. The document list 2520 displays a document name, a time, a document size, and the like.

When it is necessary to store the document, and when a document read button 2530 is pushed down, the image reading section 200 reads the original, the image data (hereinafter, referred to as "document") is generated, and is stored in the HDD 140. When the document is selected from the document list 2520, as illustrated in FIG. 5, a display of a selection order 2580 is added to the document.

The selected document is highlighted. In such a condition that the document is selected, the document can be printed by pushing a print button 2540, and the document can be transmitted by pushing a transmit button 2550. When a plurality of the documents are selected, the document can be combined by pushing a combine button 2560. When the document is selected, and a delete button 2570 is pushed, the document can be deleted from the list.

Next, a routine task function (workflow function) in the image processing apparatus 100 will be described.

Figure 6:
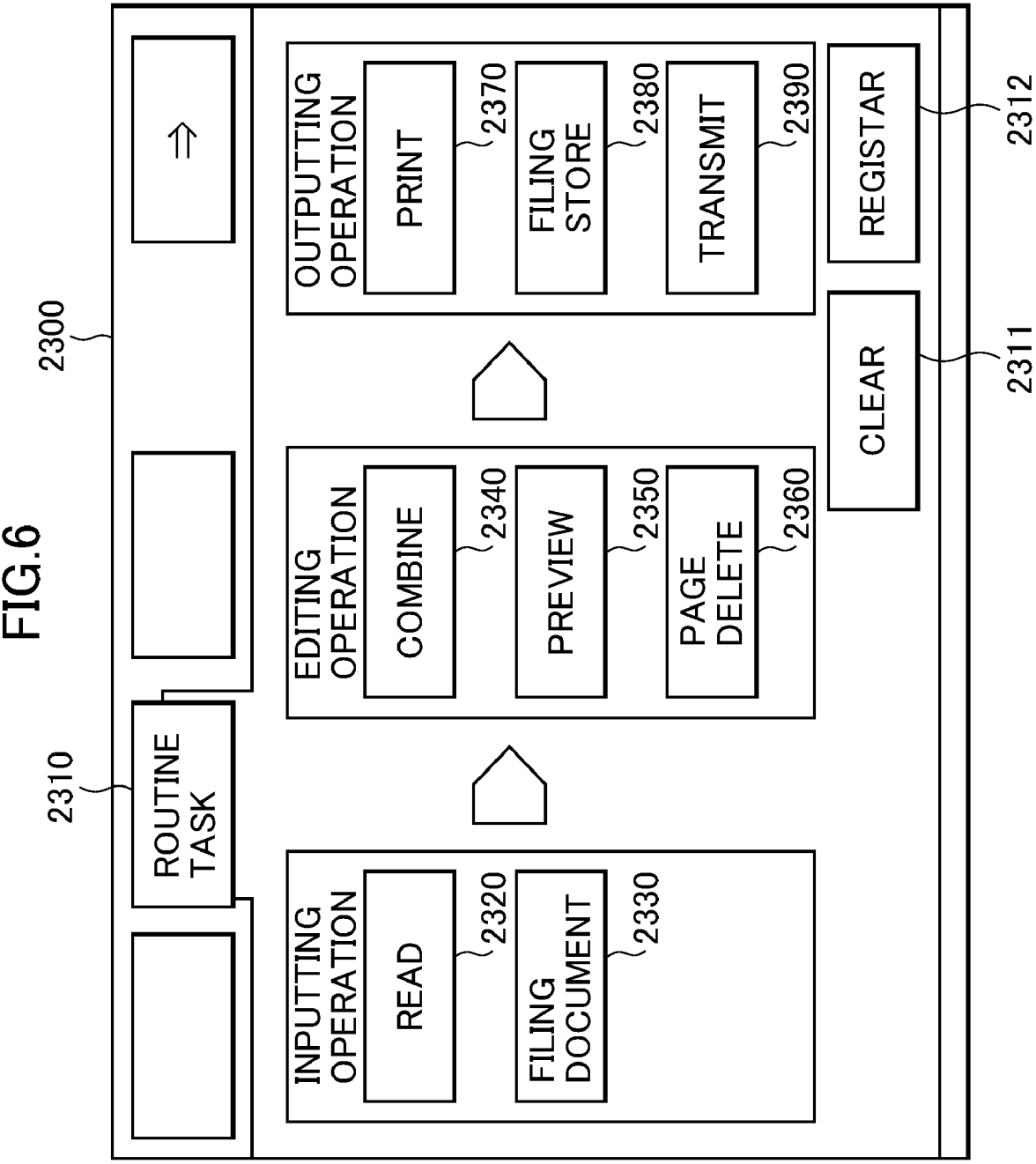
FIG. 6 is an explanatory diagram illustrating an operation screen related to a routine task function, which is displayed in the display unit illustrated in FIG. 1.
Figure 7:
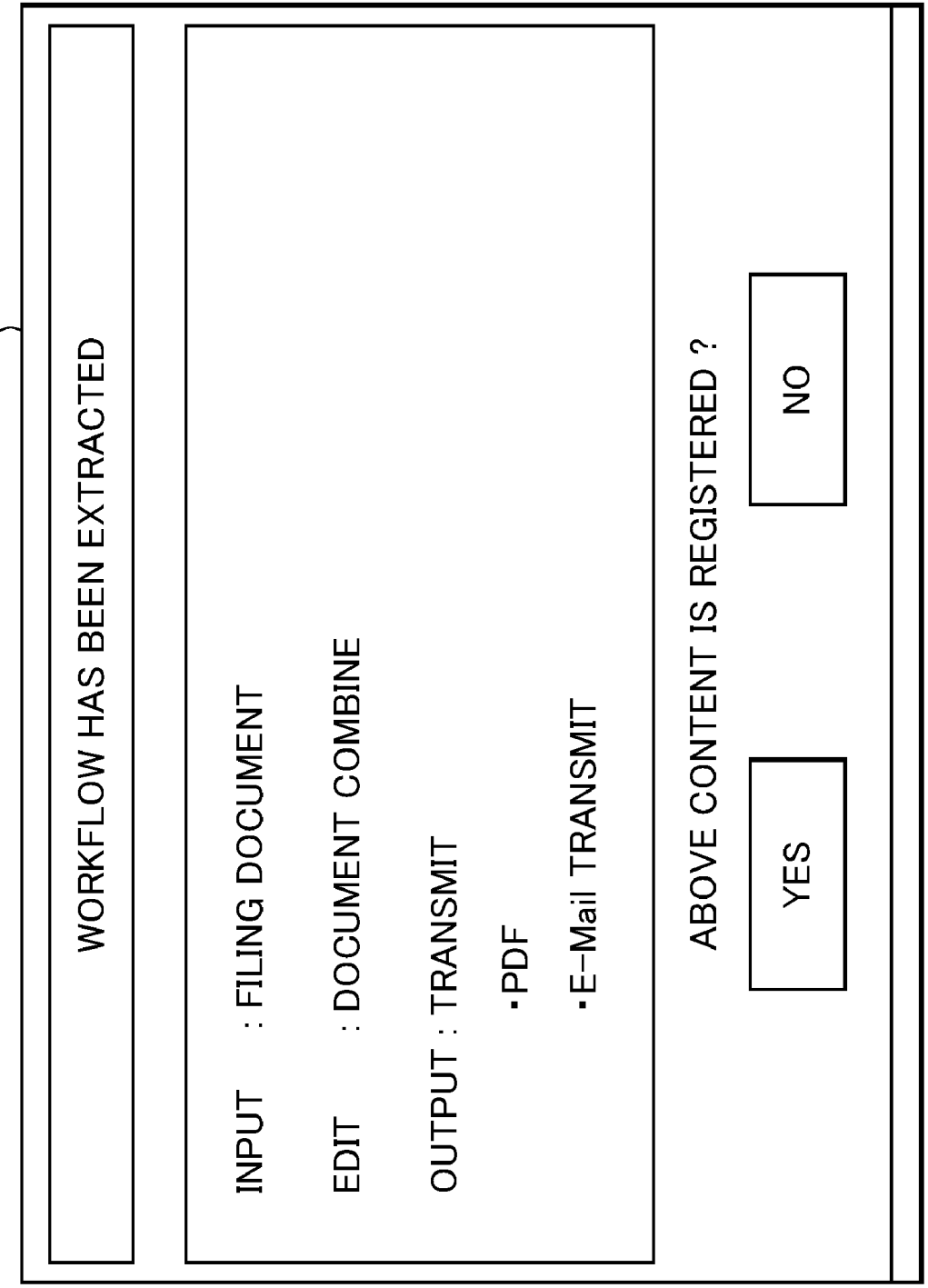
FIG. 7 is an explanatory diagram illustrating an operation screen related to the routine task function, which is displayed in the display unit illustrated in FIG. 1.

FIG. 6 and FIG. 7 are explanatory diagrams illustrating the operation screen related to the routine task function, which is displayed in the display unit 510 in FIG. 1.

The routine task function of the present embodiment is a function for setting one workflow by combining a variety of functions included by the image processing apparatus 100, such as the printing function, the reading function, the transmitting function, and a filing storing function. That is, the routine task function is a function for previously registering device operation information including a series of settings and functions, and calling up and executing the registered device operation information according to necessity.

Here, the workflow of the present embodiment is a macro definition by a combination of a variety of operations such as an inputting operation for Scan or Box document, an editing operation such as a combination and a document delete, and an outputting operation such as the printing, the transmitting, the Box storing. It is assumed that "operation" means an operator operation in a setting screen, which is executed for each inputting/editing/outputting. In addition, it is assumed that "work" means a series of the operations.

Thus, "one workflow" means a partition of the work which is a combination of the operations from the inputting to the outputting through the editing. A combination of operations in which "First, a document is read, next, the read document and a predetermined document are combined, and finally, the combined documents are printed" is considered as one example of this workflow, which is a combination of the functions of the image processing apparatus 100.

In this routine task function, the more detailed parameter can be set in each function (This parameter setting is referred to as "a mode of the function"). For example, the transmitting function includes the mode for an image reading setting for setting a reading file format, the mode for a transmission setting for setting a destination of the B-Mail, and the like.

In this routine task function, the registered workflow can be called up by the simple operation. For example, the routine task function is configured so that a predetermined workflow button for calling up the workflow is registered, and the operator operates a device to push down the workflow button, thereby, the predetermined workflow can be executed.

This routine task function is configured so that not only the workflow button can be registered, but also the registered workflow button can be edited and deleted in a workflow button registering/editing screen 2300 illustrated in FIG. 6.

In this workflow button registering/editing screen 2300 illustrated in FIG. 6, a routine task tab 2310 is active which indicates that a routine task function screen is displayed. This workflow button registering/editing screen 2300 is configured so that the function set by the device operation of the operator can be graphically displayed, and the function and the mode can be freely changed.

This workflow button registering/editing screen 2300 is configured so that the operator is finally caused to confirm a content of the workflow, and when the confirmed content is the workflow desired by the operator, data of this confirmed content is related to the workflow button to be registered.

The workflow button registering/editing screen 2300 is configured so that the function is classified to the inputting operation, the editing operation, and the outputting operation, and is displayed for each classified operation. The function belonging to the inputting operation corresponds to a read function button 2320, a document filing function button 2330, and the like. The function belonging to the editing operation corresponds to a combine function button 2340, a preview function button 2350, a page delete function button 2360, and the like. The function belonging to the outputting operation corresponds to a print function button 2370, a filing store function button 2380, a transmit function button 2390, and the like.

When each function button is selected, the screen proceeds to a screen for setting the mode. For example, when the transmit function button 2390 is selected, the display is switched to the transmitting function screen 2100 appearing in FIG. 2, and the detailed setting can be executed for the transmitting function. The button of the set function is configured so as to clearly indicate by changing a color that the set function is selected by the operator. The workflow button registering/editing screen 2300 is configured so that, when a clear button 2311 is pushed, the setting is initialized. The workflow button registering/editing screen 2300 is configured so that, when a register button 2312 is pushed, the workflow is registered in the HDD 140 as the combination of the selected functions. Here, the HDD 140 constitutes a storing section in which, a series of the operations are extracted which are executed by the operator to input instructions when the process is executed based on the instructions which the operator operates to input, and the extracted operations are stored as an operation history of a device operation information candidate.

FIG. 8 is an explanatory diagram of a sample illustrating a description content of the workflow registered in the HDD 140. The workflow is, for example, a text file described by the Markup language such as the XML. By using the XML, a description method is flexible, and a format of the workflow is independent from internal data of the image processing apparatus 100. Thereby, the workflow can be delivered between different apparatuses.

The description for the function and the mode of the workflow can be expressed as a tag and an attribute of the XML. For example, the description for the function is expressed as a tag 2410 appearing in FIG. 8, and the description for the mode is expressed as a tag 2420 appearing in FIG. 8.

Next, a software module (obtained by dividing components constituting software to each function unit) will be described in FIG. 9, which is used to control a combination of a variety of functions, and a flow of a process order in the image processing apparatus 100.

Figure 9:
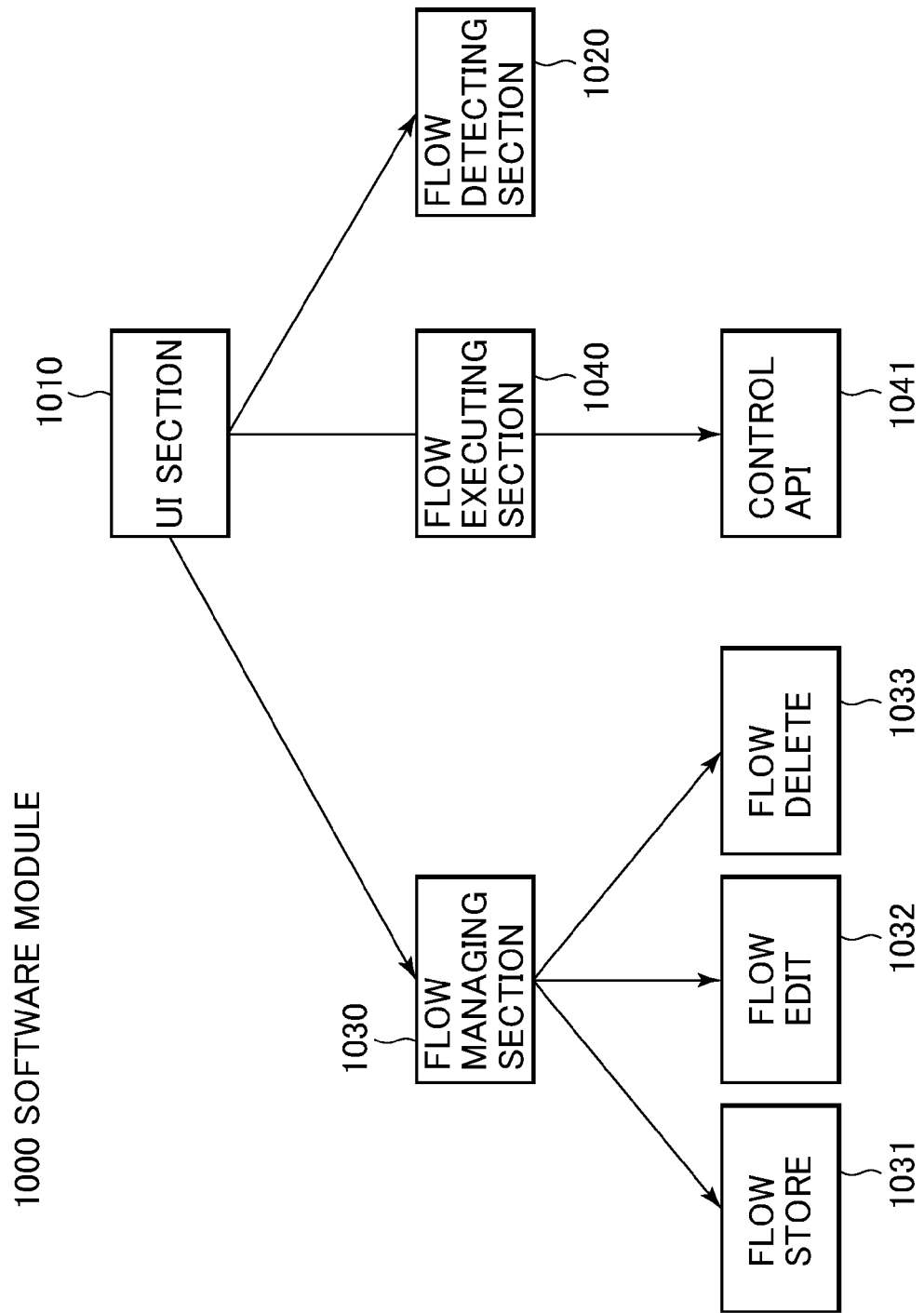
FIG. 9 is an explanatory diagram illustrating a configuration of a software module provided in the image processing apparatus illustrated in FIG. 1.

FIG. 9 is an explanatory diagram illustrating a configuration of the software module provided in the image processing apparatus 100 illustrated in FIG. 1.

This software module 1000 is stored in the HDD 140 (or at least a part of the software module 1000 may be stored in the ROM 150), and is, for example, executed by the CPU 130 of the controller section 110. This software module 1000 includes a UI section 1010, a workflow detecting section 1020, a workflow managing section 1030, and a workflow executing section 1040.

The UI section 1010 is used to receive the operation of the operator, and is the module for displaying in the display unit 510 through the operation section 500, and for inputting the operation of the operator through the operation unit 520. The operation unit 520 associates the inputted signal with a displayed menu and assigns the signal to the function which is selected by the operator.

The workflow detecting section 1020 is used to detect a series of the operations by the operator as the workflow which is the device operation information. That is, the workflow detecting section 1020 is the module for detecting the workflow from operation information by the operator, which is inputted through the UI section 1010. That is, this workflow detecting section 1020 clips a series of the operations by the operator as the workflow.

The workflow managing section 1030 is used to store and manage the workflow, and includes a storing unit 1031 for storing the workflow, an editing unit 1032 for editing the workflow, and a deleting unit 1033 for deleting the workflow.

The workflow executing section 1040 is used to recreate the registered workflow, and reads and recreates the workflow stored in the workflow managing section 1030. When the workflow is recreated, the workflow executing section 1040 executes the functions of the image processing apparatus 100 by turns in accordance with the setting described in the workflow through a control API 1041.

The control API 1041 is an interface for utilizing each function of the image processing apparatus 100, and is a unit for controlling, from the software module, the functions such as the printing, the image reading, and the document transmitting.

Next, the automatic extraction for the workflow by the image processing apparatus 100 of the present embodiment will be described as referring to FIG. 10 to FIG. 13. In the function of this automatic extraction for the workflow by the image processing apparatus 100, a template exemplified in FIG. 10 is used.

FIG. 10 is an explanatory diagram exemplifying the template for automatically extracting the workflow, which is provided in the image processing apparatus 100 illustrated in FIG. 1.

This template exemplified in FIG. 10 is generated by a device manager, or the like, and is previously stored in the HDD 140 of the image processing apparatus 100. This template is described in the XML format like the workflow, and a part of the tag is described with a code of a wild card. Meanwhile, the template mentioned above corresponds to a template having at least one part (arbitrary operation) of a normal workflow consisting of a space (arbitrary).

In the template exemplified in FIG. 10, the wild card (a part corresponding to the arbitrary operation) is described with an asterisk. A tag 1510 exemplified in the template appearing in FIG. 10 corresponds to the tag obtained by replacing the function with the wild card tag. Further, a tag 1520 corresponds to the tag obtained by replacing the mode with the wild card. In this template, the number of the functions or the modes may be replaced with the wild card, and the designation for the largeness or smallness of the number of the functions or the modes may be replaced with the wild card.

Meanwhile, here, a unit of the arbitrary operation may be a function unit of the image processing apparatus 100, or a parameter unit of the function of the image processing apparatus 100. In the arbitrary operation, the number of the functions or the largeness or smallness of the number of the functions may be designated, or the number of the parameters of the function, or the largeness or smallness of the number of the parameters of the function may be designated.

Next, a procedure of an automatic registering process for the workflow in the image processing apparatus 100 will be described in FIG. 11.

Figure 11:
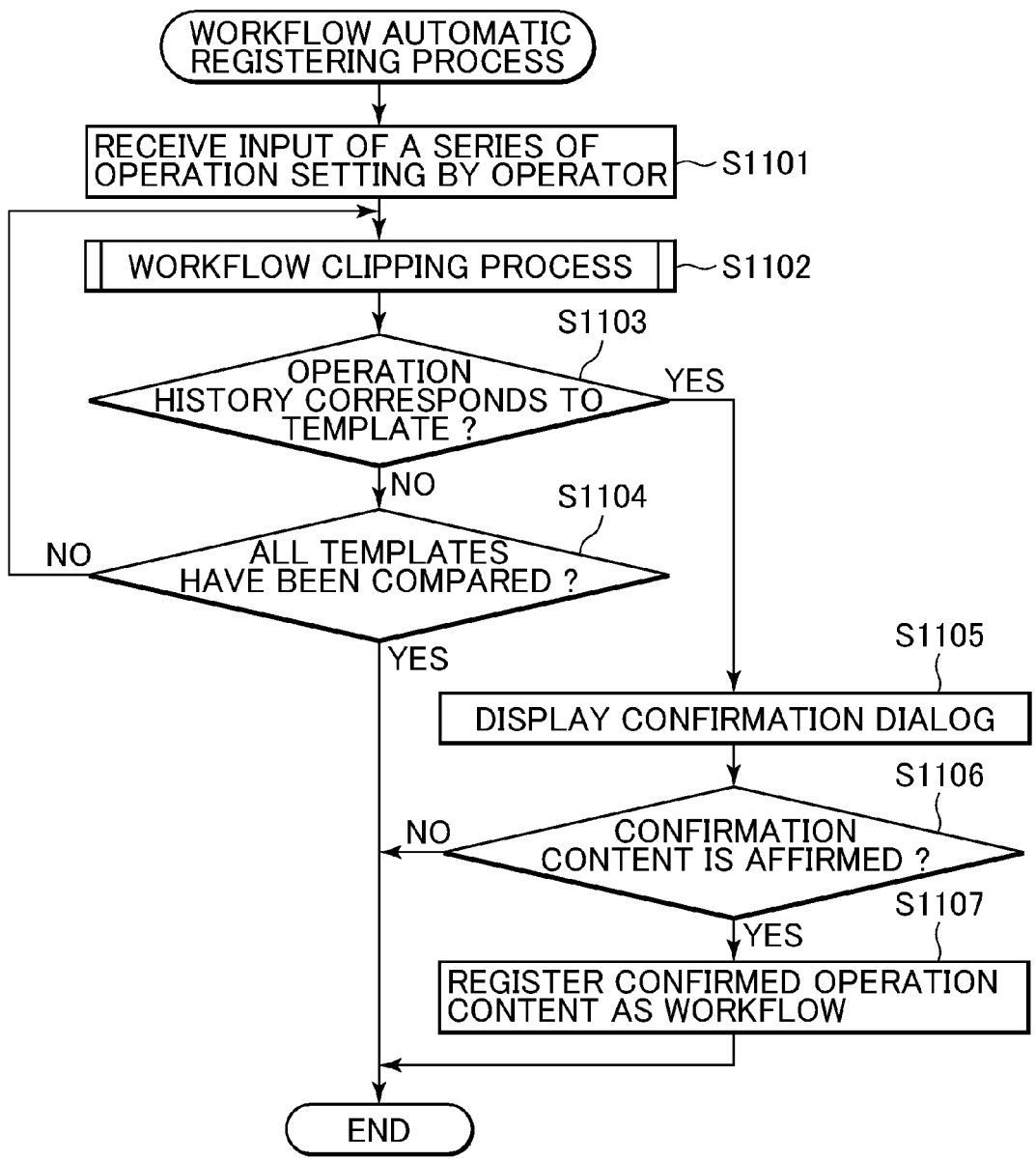
FIG. 11 is a flowchart illustrating a procedure for automatically registering the workflow, which is executed by a CPU appearing in FIG. 1.
Figure 12:
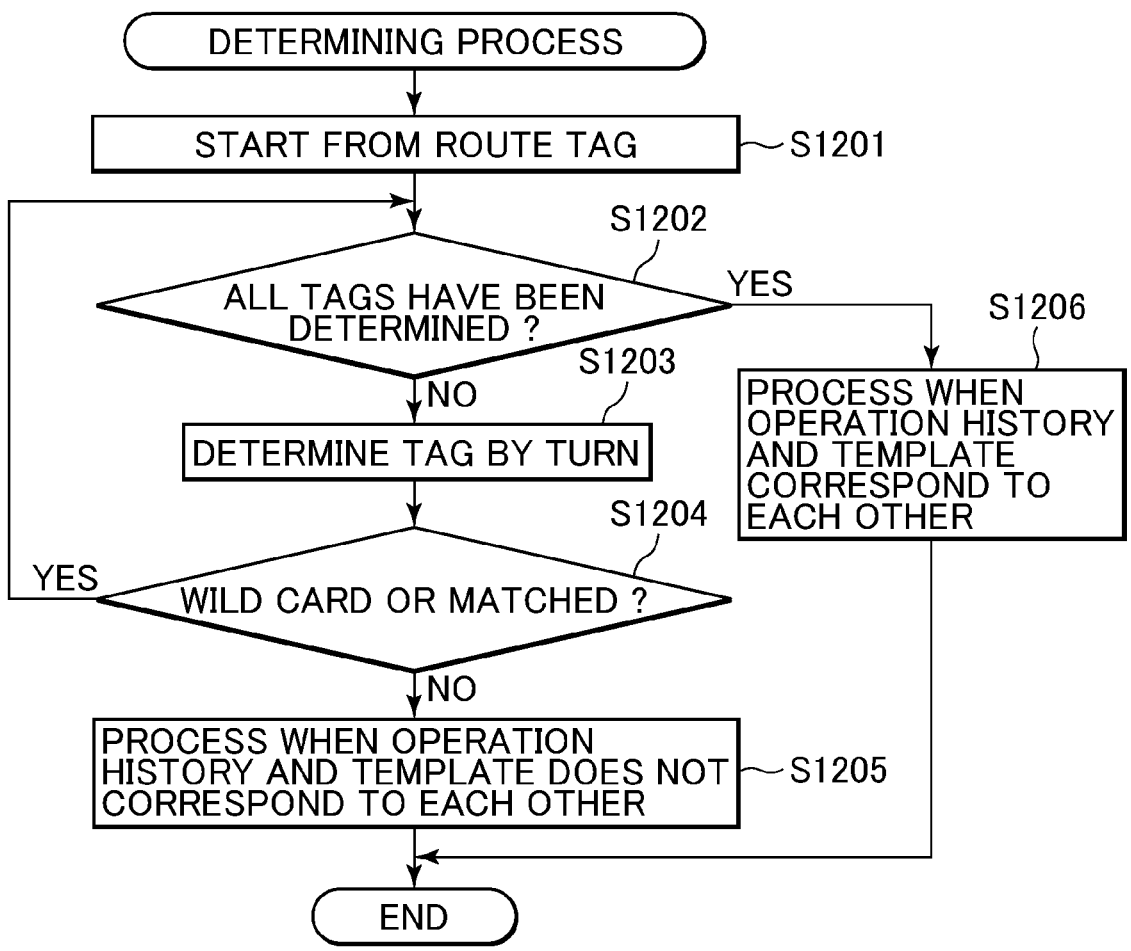
FIG. 12 is a flowchart illustrating a specific procedure for a determining process executed at step S1103 appearing in FIG. 11.

FIG. 11 is a flowchart illustrating a procedure for a workflow registering process executed by the controller section 110 in FIG. 1. Meanwhile, the processes illustrated in FIG. 12 and FIG. 13 are also executed by the controller section 110.

As illustrated in FIG. 11, in this image processing apparatus 100, the operator inputs an operation setting of a series of the functions and the modes, and the operation input is received (step S1101). Next, in this image processing apparatus 100, after it is completed to receive the input, a process (for example, a process such as the printing and the transmitting) is executed, which corresponds to a content of the received operation, and a series of the operation settings are held as an operation history (step S1102). Like the above workflow described in FIG. 8, this operation history is held (stored) in the XML format including the functions and the modes as the tags.

By comparing the operation history obtained by executing a after-mentioned workflow clipping process appearing in FIG. 13 with the above template of the workflow, which is exemplified in FIG. 8, the image processing apparatus 100 determines whether or not to register the clipped operation history for the routine task function (step S1103). The controller section 110 executes this determining process whether or not the workflow clipped from the operation history and the template correspond to each other.

That is, the controller section 110, which is a comparing unit, compares the operation history of the device operation information candidate, with a previously-stored form (template) for the partition of the work which is a combination of the operations from the inputting to the outputting through the editing. When a result of the comparing is that the operation history corresponds to the form, the controller section 110 (determining section) determines that the clipped operation history is to be registered as new device operation information.

When the determination condition is satisfied (YES at step S1103), a confirmation dialog, which confirms whether or not the clipped operation history is registered as the workflow, is displayed in the display unit 510 of the operation section 500 (operation unit) (step S1105). When the operator execute the operation to affirm the confirmation dialog (YES at step S1106), the operation history, which is clipped and corresponds to the form, is registered as the workflow, and the present process is terminated (step S1107). That is, when it is determined that the operation history being the device operation information candidate is to be registered as new device operation information, the controller section 110 (registering section) assigns the new device operation information to the desired workflow button (calling up section) for calling and executing the new device operation information, and stores (registers) the assigned device operation information in the HDD 140, which is an operation information storing unit.

When the determination condition is not satisfied (NO at step S1103), the process returns to a determining process whether another template to be compared still remains, and when the other template does not remain (YES at step S1104), or when the operator denies the confirmation dialog (NO at step S1106), the present process is terminated.

Next, a procedure for the determination on whether or not the workflow clipped from the operation history and the template correspond to each other will be described in FIG. 12.

FIG. 12 is a flowchart illustrating the procedure for the determining process executed at step S1103 appearing in FIG. 11.

As illustrated in FIG. 12, the CPU 130 of the controller section 110 first executes a process for following the tags by turns from a route tag of the XML, which is expressed in a hierarchical structure (step S1201). This process is continued until all the tags are determined (NO at step S1202).

In this process, it is determined by turns whether or not a tag description of the template and the content of the operation history correspond to each other for each of the tags (step S1203). Next, when the content of the operation history corresponds to the tag description, or is described in the wild card, it is determined that the operation history corresponds to the tag (YES at step S1204).

When even at least one tag is included, which the operation history does not correspond to (NO at step S1204), it is determined that the template and the operation history do not correspond to each other, a process (process in a discrepancy case) when the template and the operation history do not correspond to each other is executed, and the present process is terminated (step S1205). In this case, a result of the determination at step S1103 appearing in FIG. 11 is "NO".

When all the tags correspond to the operation history, it is determined that the template and the operation history correspond to each other (YES at step S1202), and a process when the template and the operation history correspond to each other is executed, and the present process is terminated (step S1206). In this case, the result of the determination at step S1103 appearing in FIG. 11 is "YES".

Next, a procedure of the workflow clipping process will be described hereinafter by referring to FIG. 13.

FIG. 13 is a flowchart of the workflow clipping process executed at step S1102 appearing in FIG. 11.

First, to easily understand the flowchart appearing in FIG. 13, a condition will be described, which is an assumption to partition the operation history when the workflow is clipped from the operation history.

This workflow executed in the image processing apparatus 100 is configured with a combination of each function. These functions can be roughly classified to the input-type function, the edit-type function, and the output-type function. Here, by noticing the fact that the workflow is configured with a flow of inputting via editing to outputting, the workflow is clipped from the operation history. This process that the workflow is clipped from the operation history is executed to specify the device operation information candidate obtained by selecting, from the operation history, a procedure of a series of the routine processes, which is appropriate as a versatile procedure (a procedure for executing the inputting and the editing, and completing the outputting) which is suitable to be registered in the routine task function to be utilized.

The operation corresponding to the inputting includes such an operation that the document is generated by reading the original by utilizing the image reading section 200, such an operation that the document in the storage or the document outside the apparatus is designated, and the like. The operation corresponding to the editing includes such an operation that the documents are combined, such an operation that the document is deleted, such an operation that a page is edited, such an operation that the previewing is executed, and the like. The operation corresponding to the outputting includes the printing, such an operation that the document is transmitted to the outside, such an operation that the document is stored in the storage, and the like.

As described above, when the workflow is clipped by a detecting method for a workflow candidate, it is assumed that a time point when the outputting operation is executed is a termination point of the workflow, or a time point just before the different workflow is started is a termination point of the workflow because it can be determined that the different workflow is started when the different document is caused to be operated. That is, when a plurality of the operations for the same document are included in the operation history, it can be assumed that a plurality of such operations are one workflow. That is, in this detecting method for the workflow candidate, the device operation information is classified to the inputting operation, the editing operation, and the outputting operation, and it is assumed that a clipping position is a time point just before the document to be operated is changed from the adjacent document to be operated, or a time point when the outputting operation is executed.

In the image processing apparatus 100, based on the above assumption, as illustrated in the flowchart appearing in FIG. 13, first, one operation is selected from the operation history.

This selected operation is referred to as an operation A (step S1301). When the operation to be selected is not included after the operation A in the operation history, that is, when the operation A is the last operation in the recorded operation history (YES at step S1302), it is assumed that the starting operation to the operation A is one workflow (step S1307), and the present process is terminated.

When the document to be operated in the operation A is different from the document to be operated in the operation before the operation A (the document to be operated in the operation A is changed from the document to be operated in the operation before the operation A) (YES at step S1304), the process proceeds to step S1303. At step S1303, it is assumed that the different workflow is started from the operation A, so that it is assumed that the starting operation to the operation just before the operation A is one workflow, and the process proceeds to step S1308. On the other hand, when the document to be operated in the operation A is the same as the document to be operated in the operation before the operation A (NO at step S1304), and the process proceeds to step S1305.

When the operation A is the outputting operation (YES at step S1305), it is assumed that a series of the operations from the starting operation to the operation A which is the current operation is one workflow (step S1306), and the process proceeds to step S1308. On the other hand, when the operation A is not the outputting operation (NO at step S1305), the process proceeds to step S1301.

At step S1308, the next operation just after the current operation recorded in the operation history is designated to be the operation A. Next, the processes after step S1301 are repeated.

Here, a specific example of a workflow automatic registering process will be described, which is realized by the image processing apparatus 100 executing the flowcharts appearing in FIG. 11 to FIG. 13. In this specific example, such a case will be described that the operator executes the following operations of (1) to (3): (1) Two filing documents stored in the HDD 140 are selected; (2) The two selected documents are combined; and (3) Further, the combined document is transmitted by E-Mail with the designation of a file format PDF. In this specific example, it is assumed that the template has been already registered, which corresponds to the operation in which "Filing documents are combined to be transmitted by E-Mail with the PDF format".

First, the image processing apparatus 100 receives the setting inputted by the operator. In this case, a document filing screen is selected by the operator in the image processing apparatus 100 (FIG. 4). The two documents are selected from the filing documents (FIG. 5). This operation corresponds to the inputting operation of (1).

Next, the operator pushes down the combine button 2560 to combine the documents. This operation corresponds to the editing operation of (2).

Next, the operator selects the combined document, and pushes down the transmit button 2550. When the transmit button 2550 is pushed down, the screen is switched to the transmitting function screen 2100 (FIG. 2). In the transmitting function screen 2100, the operator pushes down the transmit set button 2150, selects the PDF as a transmission file format, and selects the E-Mail as a transmission protocol. When the operator executes the transmitting, the image processing apparatus 100 transmits the combined document attached to the E-Mail. This operation corresponds to the outputting operation of (3).

By a series of such operations of the operator, the image processing apparatus 100 extracts the workflow. In this case, the workflow is clipped by designating a time point when the transmitting operation is executed, which is the outputting operation, to be the termination point. Next, the image processing apparatus 100 compares the template with the clipped workflow. When a plurality of the workflows are registered, a comparing work is continued until the template corresponding to the workflow is detected. When the template corresponds to the workflow, a confirmation dialog 2600 is displayed in the display unit 510 (FIG. 7). In the confirmation dialog 2600, a content of the workflow is displayed. After the operator executes the inputting for the confirmation, the image processing apparatus 100 registers the workflow to the routine task function.

Meanwhile, in the image processing apparatus 100 according to the above embodiment, when a rule for the template is, for example, not so restricted (when the number of the functions is small), the workflows to be extracted may increased too much. In such a case, a function may be added that subjects the automatically-extracted workflows to further determination and, when a result of the further determination is not satisfied as described later, stops registering the extracted workflows, and forcibly neglects the extracted workflows.

In this case, when the template corresponds to the clipped workflow in the comparison executed by the image processing apparatus 100, and when a predetermined condition is not satisfied, the device operation information is not stored. Here, the predetermined condition is the determination whether or not the number of the functions is equal to or less than a predetermined value, which are matched to the tags of the template when the template which is the form of the device operation information is compared with the extracted workflow (operation information), and when the number of the matched functions is equal to or less than the predetermined value, the registering process is stopped. That is, in the further determination, the number of the matched tags except the wild card is calculated, and only when a certain or more number of tags are matched, the workflow can be registered. The workflow is not registered, whose number of the tags is equal to or less than the predetermined value, that is, which does not include so complex settings, and the workflow is registered, which includes the relatively complex settings, thereby, it becomes possible to register only the workflow whose utility value is high.

It is to be understood that the object of the present invention may be also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above. Alternatively, in the present invention, by causing an OS (Operating System) running on the computer to perform a part or all of the actual processing based on the instructions in the program code, the functions of the embodiments described above may be realized. In addition, in the present invention, the program code read from the storage medium is written into a memory provided on a function expansion board inserted into the computer or in a function expansion unit connected to the computer. The CPU, or the like provided in the function expansion board or the function expansion unit may perform a part or all of the actual processing based on the instructions in the program code. Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-280592, filed Oct. 29, 2007, which is hereby incorporated by reference herein in its entirety.

What is claimed is:

1. An image processing apparatus provided with a plurality of functions for an image processing, and capable of executing a process including a combination of the plurality of the functions as a workflow, comprising:
   an operation unit adapted to receive an operation by an operator for the image processing apparatus;
   a storing unit adapted to store the operation by the operator as an operation history, the operation being received by said operation unit;
   an extracting unit adapted to extract operation information for causing the workflow to be executed from the operation history stored in said storing unit; and
   a registering unit adapted to register the operation information extracted by said extracting unit as a workflow.

2. The image processing apparatus according to claim 1, wherein said extracting unit further includes:
   an clipping unit adapted to clip the operation information for causing the workflow to be executed from the operation history; and
   a determining unit adapted to determine whether or not the operation information clipped by said clipping unit is to be registered in said registering unit, and
   wherein said registering unit registers the operation information determined by said determining unit to be registered.

3. The image processing apparatus according to claim 2, wherein said extracting unit further includes a comparing unit adapted to compare the operation information clipped by said clipping unit, and a form of a predetermined operation information, and
   wherein said determining unit determines, based on a result of the comparison by said comparing unit, whether or not the operation information is to be registered in said registering unit.

4. The image processing apparatus according to claim 2, wherein said clipping unit clips a plurality of operations for the same document as one operation information in the operation history.

5. The image processing apparatus according to claim 2, wherein the operation history stored in said storing unit includes an operation history for the operation for inputting an image, an operation history for the operation for editing the image, and an operation history for the operation for outputting the image, and
   wherein said clipping unit clips the operation information, a clipping position of which is positioned between the operation history for the operation for outputting the image, and an operation history just thereafter which are stored in said storing unit.

6. The image processing apparatus according to claim 1, wherein the operation information is described by the Markup language.

7. The image processing apparatus according to claim 3, wherein said determining unit further determines that the operation information is not registered when the operation information clipped by said clipping unit does not satisfy a predetermined condition.

8. The image processing apparatus according to claim 7, wherein the predetermined condition is the number of items of the form of the operation information which are matched when the form of the operation information is compared with the operation information by said comparing unit.

9. A workflow registering method performed by an image processing apparatus provided with a plurality of functions for an image processing, and capable of executing a process including a combination of the plurality of the functions as a workflow, comprising:
   a storing step of storing an operation by an operator as an operation history in a storing unit, the operation being received through an operation unit;
   an extracting step of extracting operation information for causing the workflow to be executed from the operation history stored in said storing step; and
   a registering step of registering the operation information extracted in said extracting step as a workflow.

10. A non-transitory computer-readable storage medium storing a program for causing an image processing apparatus to implement a workflow registering method in the image processing apparatus provided with a plurality of functions for an image processing and capable of executing a process including a combination of the plurality of the functions as a workflow, the method including:
   a storing step of storing an operation by an operator as an operation history in a storing unit, the operation being received through an operation unit;
   an extracting step of extracting operation information for causing the workflow to be executed from the operation history stored in said storing step; and
   a registering step of registering the operation information extracted in said extracting step as a workflow.

* * * * *